(12) United States Patent
Keating et al.

(10) Patent No.: US 12,092,730 B2
(45) Date of Patent: Sep. 17, 2024

(54) MULTI-CELL POSITIONING

(71) Applicant: Nokia Technologies Oy, Espoo (FI)

(72) Inventors: Ryan Keating, Chicago, IL (US); Tao Tao, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 497 days.

(21) Appl. No.: 17/431,280

(22) PCT Filed: Feb. 15, 2019

(86) PCT No.: PCT/CN2019/075251
§ 371 (c)(1),
(2) Date: Aug. 16, 2021

(87) PCT Pub. No.: WO2020/164124
PCT Pub. Date: Aug. 20, 2020

(65) Prior Publication Data
US 2022/0128684 A1     Apr. 28, 2022

(51) Int. Cl.
*G01S 13/87* (2006.01)
*H04W 64/00* (2009.01)

(52) U.S. Cl.
CPC .......... *G01S 13/878* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 2011/0105144 A1* | 5/2011 | Siomina | G01S 5/0268 455/456.1 |
| 2018/0343048 A1* | 11/2018 | Radulescu | G01S 5/10 |

FOREIGN PATENT DOCUMENTS

| | | |
|---|---|---|
| CN | 1398129 A | 2/2003 |
| EP | 3036948 A2 | 6/2016 |
| WO | WO 96/35306 | 11/1996 |
| WO | WO 2010/147525 A1 | 12/2010 |
| WO | WO 2011/056119 A1 | 5/2011 |
| WO | WO-2015/026287 A2 | 2/2015 |

OTHER PUBLICATIONS

"NR beam management supporting multi-gNB measurements for positioning", Fraunhofer HS, Fraunhofer HHI, 3GPP TSG RAN WG1 Meeting #95, R1-1813583, Nov. 2018, 8 pages.

(Continued)

*Primary Examiner* — Frantz Bataille
(74) *Attorney, Agent, or Firm* — Harrington & Smith

(57) ABSTRACT

Embodiments of the present disclosure relate to methods, devices, apparatuses and computer readable storage media for multi-cell positioning. In example embodiments, a method is provided. The method includes transmitting, from a first network device, a first reference signal to a terminal device served by a second network device. The method further includes receiving a second reference signal from the second network device. The method further includes determining a first time difference between a time at which the first RS is transmitted and a time at which the second reference signal is received. In addition, the method includes transmitting information on the first time difference to a location server. As such, the location server can determine positioning information about the terminal device.

18 Claims, 9 Drawing Sheets

(56) References Cited

OTHER PUBLICATIONS

"Potential Positioning Techniques—DL + UL based solutions", Nokia, Nokia Shanghai Bell, 3GPP TSG RAN WG1 Meeting #AH-1901, R1-1901024, Jan. 2019, 3 pages.
"Discussions on Combination of DL & UL based Positioning", LG Electronics, 3GPP TSG RAN WG1 Ad-Hoc Meeting 1901, R1-1900631, Jan. 2019, 4 pages.
"Combined Downlink and Uplink NR Positioning Procedures", Qualcomm Incorporated, 3GPP TSG-RAN WG2 Meeting #104, R2-1817899, Nov. 2018, 18 pages.

\* cited by examiner

MULTI-CELL POSITIONING

CROSS REFERENCE TO RELATED APPLICATION

This patent application is a U.S. National Stage application of International Patent Application Number PCT/CN2019/075251 filed Feb. 15, 2019, which is hereby incorporated by reference in its entirety.

TECHNICAL FIELD

Embodiments of the present disclosure generally relate to the field of communications, and in particular, to methods, devices, apparatuses and computer readable storage media for multi-cell positioning.

BACKGROUND

The ability of devices in a wireless network to be aware of their positions continues to become an important feature. Some devices in the network may be aware of their positions already (such as, gNBs), while some device may be not (such as, a UE). Positioning schemes in the wireless network typically rely on timing-based techniques, angle-based techniques, or a hybrid technique. One timing-based technique is based on round trip time (RTT) estimates. If the RTTs between a UE and multiple gNBs are estimated, the position of the UE can be determined. In the latest 3GPP specifications (Release 16), it has been agreed that multi-cell RTT based positioning is to be supported in new radio access (NR). Compared with other timing-based techniques, the RTT based positioning methods do not suffer from synchronization errors.

In the multi-cell RTT based positioning, the neighbor cell RTT needs to be estimated though a downlink (DL) and uplink (UL) signaling exchange procedure. Specifically, the neighbor cell needs to estimate receiving timing by measuring a UL reference signal (RS) from a terminal device (such as, a UE). However, the hearability of the UL signal may be a challenge for a remote neighbor cell due to low transmit power. Furthermore, in some scenarios, there may be a large difference between DL and UL link budgets. The link budget difference further decreases the hearability for the UL signaling compared with the DL signaling. In addition to the link budget difference, the terminal device may also beam form its transmission. Without proper beam management between the terminal device and the neighbor cell, the hearablity of the UL signaling may be further decreased.

SUMMARY

In general, example embodiments of the present disclosure provide methods, devices, apparatuses and computer readable storage media for multi-cell positioning.

In a first aspect, there is provided a method comprising: transmitting, from a first network device, a first reference signal (RS) to a terminal device served by a second network device; receiving a second RS from the second network device; determining a first time difference between a time at which the first RS is transmitted and a time at which the second RS is received; and transmitting information on the first time difference to a location server.

In a second aspect, there is provided a method comprising: receiving, at a terminal device, a first reference signal (RS) from a first network device; transmitting a third RS to a second network device serving the terminal device; determining a second time difference between a time at which the first RS is received and a time at which the third RS is transmitted; and transmitting information on the second time difference to a location server.

In a third aspect, there is provided a method comprising: receiving, from a terminal device, a third reference signal (RS) at a second network device serving the terminal device; transmitting a second RS to a first network device; determining a fourth time difference between a time at which the third RS is received and a time at which the second RS is transmitted; and transmitting information on the fourth time difference to a location server.

In a fourth aspect, there is provided a method comprising: obtaining, from a first network device, information on a first time difference between a time at which the first network device transmits a first reference signal (RS) to a terminal device served by a second network device and a time at which the first network device receives a second RS from the second network device; obtaining, from the terminal device, information on a second time difference between a time at which the terminal device receives the first RS from the first network device and a time at which the terminal device transmits a third RS to the second network device; obtaining, from the second network device, information on a fourth time difference between a time at which the second network device receives the third RS from the terminal device and a time at which the second network device transmits the second RS to the first network device; and determining positioning information about the terminal device at least based on the first, second and fourth time differences.

In a fifth aspect, there is provided a device comprising at least one processor and at least one memory including computer program code. The at least one memory and the computer program code are configured to, with the at least one processor, cause the device at least to perform the method according to the first aspect.

In a sixth aspect, there is provided a device comprising at least one processor and at least one memory including computer program code. The at least one memory and the computer program code are configured to, with the at least one processor, cause the device at least to perform the method according to the second aspect.

In a seventh aspect, there is provided a device comprising at least one processor and at least one memory including computer program code. The at least one memory and the computer program code are configured to, with the at least one processor, cause the device at least to perform the method according to the third aspect.

In an eighth aspect, there is provided a device comprising at least one processor and at least one memory including computer program code. The at least one memory and the computer program code are configured to, with the at least one processor, cause the device at least to perform the method according to the fourth aspect.

In a ninth aspect, there is provided an apparatus comprising means to perform the method according to the first, second, third or fourth aspect.

In a tenth aspect, there is provided a computer readable storage medium that stores a computer program thereon. The computer program, when executed by a processor of a device, causes the device to perform the method according to the first, second, third or fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
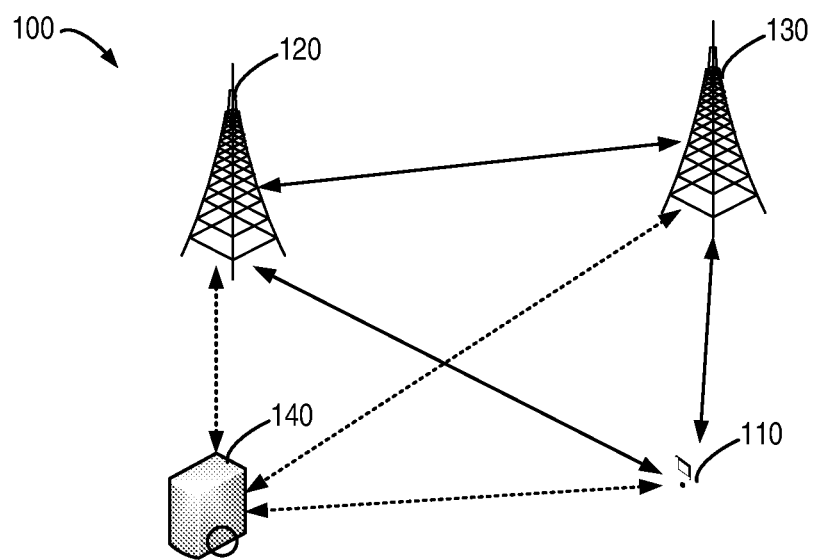
FIG. 1 illustrates a schematic diagram of a communication system according to embodiments of the present disclosure.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "wireless communication network" refers to a network following any suitable wireless communication standards, such as New Radio (NR), Long Term Evolution (LTE), LTE-Advanced (LTE-A), Wideband Code Division Multiple Access (WCDMA), High-Speed Packet Access (HSPA), and so on. The "wireless communication network" may also be referred to as a "wireless communication system." Furthermore, communications between network devices, between a network device and a terminal device, or between terminal devices in the wireless communication network may be performed according to any suitable communication protocol, including, but not limited to, Global System for Mobile Communications (GSM), Universal Mobile Telecommunications System (UMTS), Long Term Evolution (LTE), New Radio (NR), wireless local area network (WLAN) standards, such as the IEEE 802.11 standards, and/or any other appropriate wireless communication standard either currently known or to be developed in the future.

As used herein, the term "network device" refers to any suitable device at a network side of a communication network. The network device may include any suitable device in an access network of the communication network, for example, including a node B (NodeB or NB), an evolved NodeB (eNodeB or eNB), a New Radio (NR) NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "communication device", "terminal", "user equipment" and "UE" may be used interchangeably.

As yet another example, in an Internet of Things (JOT) scenario, a terminal device may represent a machine or other device that performs monitoring and/or measurement, and transmits the results of such monitoring and/or measurements to another terminal device and/or network device. The terminal device may in this case be a machine-to-machine (M2M) device, which may in a 3GPP context be referred to as a machine-type communication (MTC) device. As one particular example, the terminal device may be a UE implementing the 3GPP Narrow Band Internet of Things (NB-IoT) standard. Examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

In timing-based positioning solutions, one factor that plays an important role in the performance is the number of hearable network devices in an area of interest, such as an environment where there are some target terminal devices to be positioned. As used herein, the word "hearable" means that the signal quality is sufficiently strong, such that the receiving device can make reasonable timing estimates based on the reception. In principle, the positioning error decrease with the number of hearable network devices being increased.

As described above, in the multi-cell RTT based positioning methods, the neighbor cell RTT needs to be estimated though a DL and UL signaling exchange procedure. More specifically, the neighbor cell needs to estimate receiving timing by measuring a UL RS from a UE. However, the hearability of the UL signal may be a challenge for a remote neighbor cell due to low transmit power. Furthermore, in some scenarios, there may be a large difference between DL and UL link budgets. The link budget difference further decreases the hearability for the UL signaling compared with the DL signaling. In addition to the link budget difference, the UE may also beam form its transmission.

Without proper beam management between the UE and the neighbor cell, the hearability of the UL signaling may be further decreased. In this event, additional UL transmissions may be required for the hearability to be improved.

Embodiments of the present disclosure provide a scheme for multi-cell positioning, so as to at least in part solve the above and other potential problems. Some example embodiments of the present disclosure will be described below with reference to the figures. However, those skilled in the art would readily appreciate that the detailed description given herein with respect to these figures is for explanatory purpose as the present disclosure extends beyond theses limited embodiments.

FIG. 1 shows an example communication network 100 in which implementations of the present disclosure can be implemented. The communication network 100 includes a terminal device 110, a serving network device 130 which provides a serving cell to serve the terminal device 110, and a neighboring network device 120 which provides a neighbor cell. In the following, the neighboring network device 120 may be also referred to as a first network device, and the serving network device 130 may be also referred to as a second network device. It is to be understood that the number of network devices, terminal devices and/or cells is given for the purpose of illustration without suggesting any limitations to the present disclosure. The communication network 100 may include any suitable number of network devices, terminal devices and/or cells adapted for implementing implementations of the present disclosure.

As shown in FIG. 1, the communication network 100 may also include a location server 140, which is communicatively coupled with the terminal device 110, the first network device 120 and the second network device 130. The location server 140 is responsible for positioning different devices in the network 100. For example, the location server 140 may be a physical or logical entity that collects measurements and other location information from terminal devices and network devices, and assists these devices in estimating their positions. The location server 140 may be a separate entity in a core network or be resided at a network device or a terminal device. In a LTE system, the location server 140 may include Evolved Serving Mobile Location Center (E-SMLC) and Secure User Plane Location (SUPL). In an NR system, the location server 140 may be a Location Management Function (LMF). Although the location server 140 is shown as a separate device from the devices 110, 120 and 130, it is to be understood that the location server 140 can also be implemented at one of the devices 110, 120 and 130 in some embodiments.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

According to embodiments of the present disclosure, in order to determine the position of the terminal device 110, the serving network device 130 may act as a relay for RTT (or propagation delay) estimation between the terminal device 110 and the neighboring network device 120. In particular, the neighboring network device 120 may transmit a DL signal to the terminal device 110, such that the terminal device 110 measures the receiving time of the DL signal. Then, the terminal device 110 may transmit an UL signal to the serving network device 130, such that the serving network device 130 measures the receiving time of the UL signal. Finally, the serving network device 130 may transmit a signal to the neighboring network device 120, such that the neighboring network device 120 measures the receiving time of the signal. The terminal device 110, the serving network device 130 and the neighboring network device 120 may transmit their measurements to the location server 140.

The location server 140 may estimate the RTT between the terminal device 110 and the neighboring network device 120 or propagation delay from the neighboring network device 120 to the terminal device 110 based on the measurements received from the terminal device 110, the serving network device 130 and the neighboring network device 120. Then, the location server 140 can use the estimated results for determining positioning information about the terminal device 110.

As such, the number of hearable network devices in the network 100 can be increased. There is no need for the terminal device 110 to transmit an UL signal to the neighboring network device 120. Therefore, the position accuracy can be improved without requiring large overhead or complex signaling. In addition, compared with other timing-based positioning techniques (such as, techniques based on Observed Time Difference of Arrival (OTDOA), or Uplink Time Difference of Arrival (UTDOA)), embodiments of the present disclosure do not suffer from synchronization errors.

Figure 2:
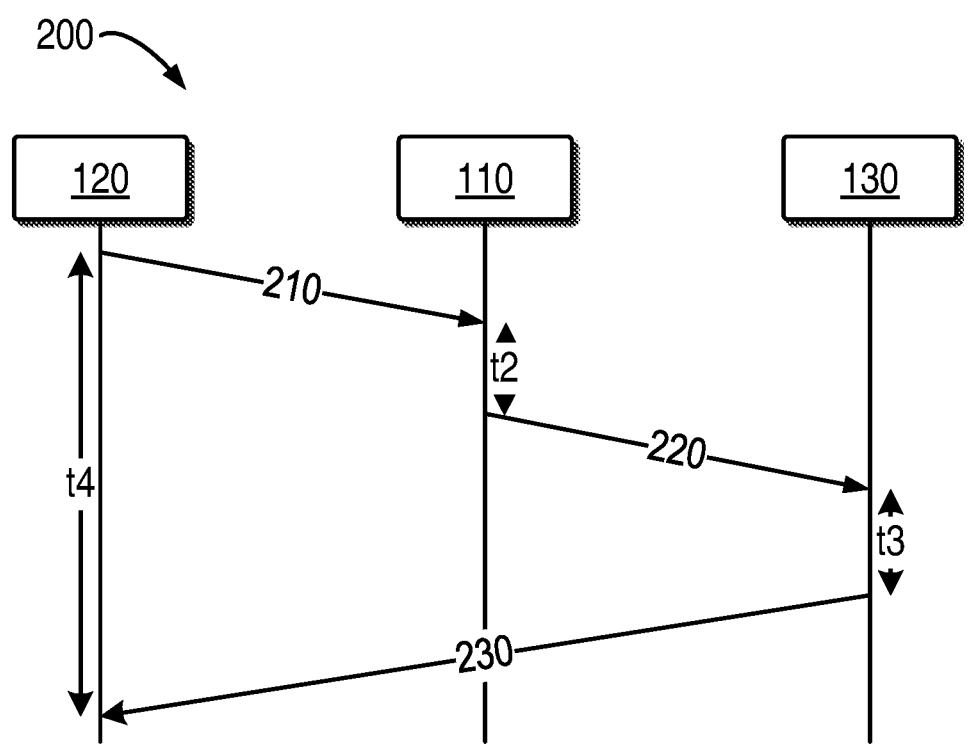
FIG. 2 illustrates a signaling diagram according to embodiments of the present disclosure.

FIG. 2 is a diagram illustrating a signaling procedure 200 in accordance with embodiments of the present disclosure. For the purpose of discussion, the signaling procedure 200 will be described with reference to FIG. 1.

As shown in FIG. 2, in order to determine positioning information about the terminal device 110, the neighboring network device 120 may transmit 210 a RS (also referred to as "first RS") to the terminal device 110. The terminal device 110 may receive the first RS from the neighboring network device 120 and determine the receiving time of the first RS. The terminal device 110 may transmit 220 a RS (also referred to as "third RS") to the serving network device 130. The terminal device 110 may determine a time difference (also referred to as "second time difference") between the receiving time of the first RS and the transmitting time of the third RS, for example, which is represented as "t2" in FIG. 2. The terminal device 110 may transmit information on the time difference t2 to the location server 140, such that the location server 140 can determine the positioning information about the terminal device 110 at least based on the time difference t2.

The serving network device 130 may receive the third RS from the terminal device 110 and determine the receiving time of the third RS. The serving network device 130 may transmit 230 a RS (also referred to as "second RS") to the neighboring network device 120.

In some embodiments, the second RS transmitted by the serving network device 130 may be a common signal for other purposes as well, such as a synchronization signal (SS). In some embodiments, the second RS transmitted by the serving network device 130 may be beamformed, possibly in the direction of the neighboring network device. Alternatively, or in addition, in some embodiments, the second RS may be transmitted from the serving network device 130 to both of the terminal device 110 and the neighboring network device 120. As will be described in the following with reference to FIG. 3, the second RS transmitted from the serving network device 130 to the terminal device 110 can also be used to measure the RTT or propagation delay between the terminal device 110 and the serving network device 130.

In some scenarios, for example, the network 100 may comprise a plurality of neighboring network devices (including but not limited to the neighboring network device 120). In some embodiments, in this event, the second RS may be transmitted from the serving network device 130 to all of the plurality of neighboring network devices in the network 100. Alternatively, in other embodiments, the second RS may be transmitted from the serving network device 130 to the neighboring network device 120 only if the neighboring network device 120 is unable to hear the UL signal from the terminal device 110 or the quality of the UL signal received from the terminal device 110 is below a predetermined threshold.

As shown in FIG. 2, the serving network device 130 may determine a time difference (also referred to as "fourth time difference") between the receiving time of the third RS and the transmitting time of the second RS. For example, the fourth time difference may be represented as "t3" in FIG. 2. The serving network device 130 may transmit information on the time difference t3 to the location server 140, such that the location server 140 can determine the positioning information about the terminal device 110 at least based on the time difference t3.

The neighboring network device 120 may receive the second RS from the serving network device 130 and determine the receiving time of the second RS. The neighboring network device 120 may further determine a time difference (also referred to as "first time difference") between the transmitting time of the first RS and the receiving time of the second RS, for example, which is represented as "t4" in FIG. 2. The neighboring network device 120 may transmit information on the time difference t4 to the location server 140, such that the location server 140 can determine the positioning information about the terminal device 110 at least based on the time difference t4.

Once receiving the time difference t2 from the terminal device 110, the time difference t3 from the serving network device 130 and the time difference t4 from the neighboring network device 120, the location server 140 can estimate propagation delay from the neighboring network device 120 to the terminal device 110, or the RTT between the neighboring network device 120 and the terminal device 110.

In order to estimate the propagation delay from the neighboring network device 120 to the terminal device 110, the location server 140 needs to determine propagation delay from the terminal device 110 to the serving network device 130 and propagation delay from the serving network device 130 to the neighboring network device 120. In some embodiments, the positions of the serving network device 130 and the neighboring network device 120 may be already known at the location server 140. In this event, the location server 140 can determine the propagation delay from the serving network device 130 to the neighboring network device 120 based on their positions. Additionally, the propagation delay from the terminal device 110 to the serving network device 130 can be determined through another signaling exchange procedure (such as, as shown in FIG. 3).

Figure 3:
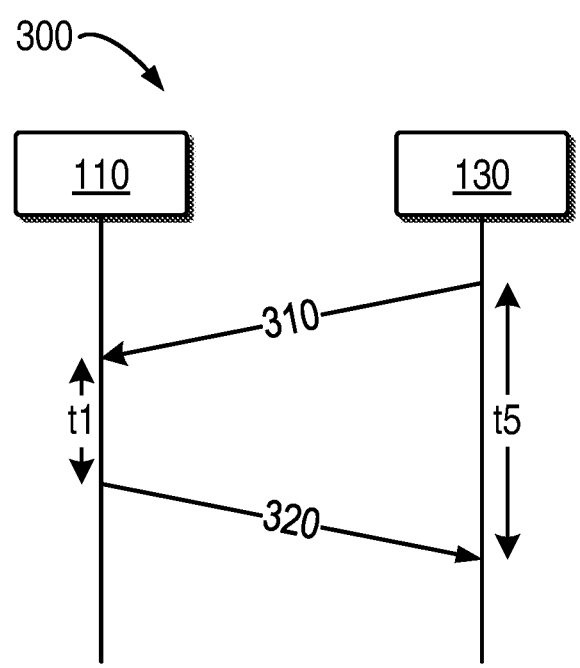
FIG. 3 illustrates a signaling diagram according to embodiments of the present disclosure.

FIG. 3 is a diagram illustrating a signaling procedure 300 in accordance with embodiments of the present disclosure. For the purpose of discussion, the signaling procedure 300 will be described with reference to FIG. 1. The signaling procedure 300 may be used to determine the propagation delay or RTT between the terminal device 110 and the serving network device 130.

As shown in FIG. 3, the serving network device 130 may transmit 310 a RS (also referred to as "fourth RS") to the terminal device 110. In some embodiments, the fourth RS transmitted from the serving network device 130 to the terminal device 110 and the second RS transmitted from the serving network device 130 to the neighboring network device 120 (shown by 230 in FIG. 2) may be a same RS. Alternatively, in other embodiments, the fourth RS and the second RS may be different signals.

The terminal device 110 may receive the fourth RS from the serving network device 130 and determine the receiving time of the fourth RS. The terminal device 110 may transmit 320 a RS (also referred to as "fifth RS") to the serving network device 130. In some embodiments, the fifth RS transmitted from the terminal device 110 to the serving network device 130 and the third RS the terminal device 110 to the serving network device 130 (shown by 220 in FIG. 2) may be a same RS. Alternatively, in other embodiments, the fifth RS and the third RS may be different signals. The terminal device 110 may further determine a time difference (also referred to as "third time difference") between the receiving time of the fourth RS and the transmitting time of the fifth RS, for example, which is represented as "t1" in FIG. 3.

The serving network device 130 may receive the fifth RS from the terminal device 110 and determine the receiving time of the fifth RS. The serving network device 130 may further determine a time difference (also referred to as "fifth time difference") between the transmitting time of the fourth RS and the receiving time of the fifth RS, for example, which is represented as "t5" in FIG. 3.

The terminal device 110 may transmit information on the time difference t1 to the location server 140. Also, the serving network device 130 may transmit information on the time difference t5 to the location server 140. The location server 140 may estimate the RTT or propagation delay between the serving network device 130 and the terminal device 110 based on the time differences t1 and t5. For example, the RTT between the serving network device 130 and the terminal device 110 may be determined as (t5−t1). The propagation delay from the terminal device 110 to the serving network device 130 may be determined as (t5−t1)/2.

In some embodiments, the location server 140 may determine the propagation delay from the neighboring network device 120 to the terminal device 110 based on the time differences t1~t5 as well as the propagation delay (for example, represented as "t6") from the serving network device 130 to the neighboring network device 120. For example, the propagation delay from the neighboring network device 120 to the terminal device 110 may be determined as (t4−t3−t2−t6−(t5−t1)/2). Alternatively, in some embodiments, the location server 140 may determine the RTT between the neighboring network device 120 and the terminal device 110 based on the time differences t1~t5 as well as the propagation delay t6 from the serving network device 130 to the neighboring network device 120. For example, the RTT between the neighboring network device 120 and the terminal device 110 may be determined as (t4−t3−t2−t6−(t5−t1)/2)*2.

Figure 4:
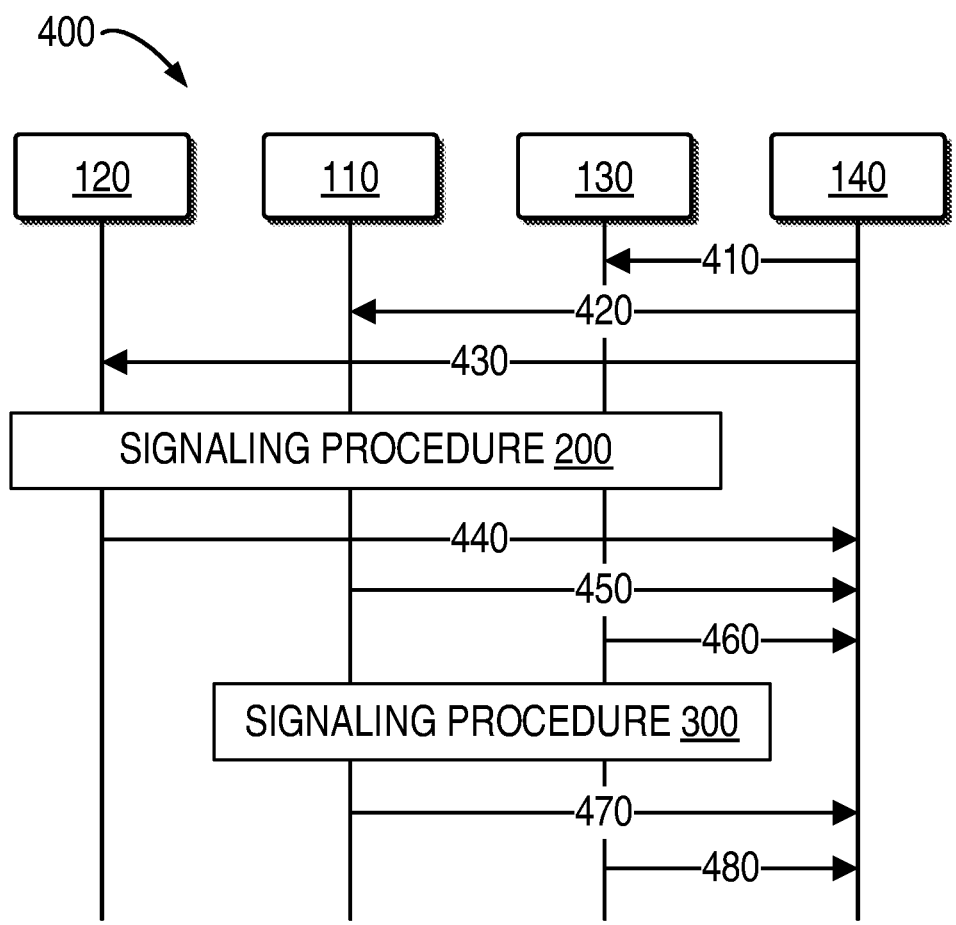
FIG. 4 illustrates a signaling diagram according to embodiments of the present disclosure.

FIG. 4 is a diagram illustrating an overall signaling procedure 400 in accordance with embodiments of the present disclosure. For the purpose of discussion, the signaling procedure 400 will be described with reference to FIG. 1. It is to be understood that the signaling sequence in FIG. 4 is shown only for the purpose of illustration, without suggesting any limitation to the present disclosure. In some embodiments, a different signaling sequence other than that as shown in FIG. 4 may be also applicable.

The positioning scheme according to embodiments of the present disclosure may be triggered or configured on demand. For example, in some embodiments, this positioning scheme may be triggered in response to the location server 140 receiving an indication of a high positioning accuracy requirement. Alternatively, in some embodiments, this positioning scheme may be triggered in response to the location server 140 receiving an indication that a neighboring network device in the network is unable to receive an UL signal from a terminal device or the quality of the UL signal received from the terminal device is below a predetermined threshold. Alternatively, in some embodiments, this positioning scheme may be triggered in response to the locations server 140 determining that the position accuracy needs to be improved.

As shown in FIG. 4, in response to the positioning scheme being triggered, the location server 140 may transmit 410, to the serving network device 130, a request (also referred to as "third request") for RTT or propagation measurement. In response to receiving the third request, the serving network device 130 may perform corresponding operations as described above with reference to FIGS. 2 and 3.

Alternatively, or in addition, the location server 140 may also transmit 410, to the serving network device 130, assistance information (also referred to as "third assistance information"). In some embodiments, the third assistance information may include a configuration (also referred to as "fourth configuration") for transmitting the second RS from the serving network device 130 to the neighboring network device 120. For example, the fourth configuration may indicate at least one of time information, frequency information, code information or spatial information about the transmission of the second RS. Additionally, the fourth configuration information may indicate the position of the neighbor network device 120, such that the serving network device 130 may determine an optimal spatial direction for the transmission of the second RS. In response to receiving the third assistance information which indicates the fourth configuration, the serving network device 130 may transmit the second RS based on the fourth configuration. The serving network device 130 may also transmit, to the location server 140, a response to the third request which indicates configuration information about the second RS. In some embodiments, in response to receiving the third request and the third assistance information, the serving network device 130 may respond to the location server 140 with the configuration information about the second RS. For example, the configuration information about the second RS may be determined either separately from the fourth configuration, or based on the fourth configuration and some additional parameters. Alternatively, or in addition, in some embodiments, the third assistance information may also indicate a configuration (also referred to as "fifth configuration") for reporting measurements, such as, a time window for reporting a time difference, a reporting periodicity, report accuracy of the time difference, or so on. In response to receiving the third assistance information indicating the fifth configuration, the serving network device 130 may report the time difference t3 and/or t5 based on the fifth configuration.

As shown in FIG. 4, in response to the positioning scheme being triggered, the location server 140 may transmit 420, to the terminal device 110, a request (also referred to as "second request") for RTT or propagation measurement. In response to receiving the second request, the terminal device 110 may perform corresponding operations as described above with reference to FIGS. 2 and 3.

Alternatively, or in addition, the location server 140 may also transmit 420, to the terminal device 110, assistance information (also referred to as "second assistance information"). In some embodiments, the second assistance information may include a configuration (also referred to as "third configuration") for reporting measurements, such as, a time window for reporting a time difference, a reporting periodicity, report accuracy of the time difference, or so on. In response to receiving the second assistance information indicating the third configuration, the terminal device 110 may report the time difference t1 and/or t2 based on the third configuration.

As shown in FIG. 4, in response to the positioning scheme being triggered, the location server 140 may transmit 430, to the neighboring network device 120, a request (also referred to as "first request") for RTT or propagation measurement. In response to receiving the first request, the neighboring network device 120 may perform corresponding operations as described above with reference to FIG. 2.

Alternatively, or in addition, the location server 140 may also transmit 430, to the neighboring network device 120, assistance information (also referred to as "first assistance information"). In some embodiments, the first assistance information may include a configuration (also referred to as "first configuration") about the second RS. In some embodiments, the first configuration may comprise information for receiving the second RS. For example, the first configuration may indicate at least one of time information, frequency information, code information or spatial information about the transmission of the second RS. Additionally, the first configuration may also indicate beam-forming information of the serving network device 130 and/or the cell identity of the serving network device 130. Alternatively or in addition, in some embodiments, the first configuration may comprise information for timing measurement based on the reception of the second RS. For example, the first configuration may indicate which algorithm to be used, the required accuracy and so on. In response to receiving the first assistance information indicating the first configuration and the first configuration comprising the information for receiving the second RS, the neighboring network device 120 may receive the second RS based on the first configuration. Additionally, in response to the first assistance information indicating the first configuration and the first configuration comprising the information for timing measurement, the neighboring network device 120 may determine the receiving time of the second RS based on the first configuration. Alternatively, or in addition, in some embodiments, the first assistance information may also indicate a configuration (also referred to as "second configuration") for reporting measurements, such as, a time window for reporting a time difference, a reporting periodicity, report accuracy of the time difference, or so on. In response to receiving the first assistance information indicating the second configuration, the neighboring network device 120 may report the time difference t4 based on the second configuration.

As shown in FIG. 4, once the requests and/or assistance information are transmitted to the neighboring network device 120, the terminal device 110 and the serving network device 130, the signaling procedure 200 as shown in FIG. 2 may be performed. Then, the neighboring network device 120 may transmit 440, to the location server 140, information on the time difference t4 (for example, based on the first assistance information). The terminal device 110 may transmit 450, to the location server 140, information on the time difference t2 (for example, based on the second assistance information). The serving network device 130 may transmit 460, to the location server 140, information on the time difference t3 (for example, based on the third assistance information).

As shown in FIG. 4, the signaling procedure 300 as shown in FIG. 3 may be performed. Then, the terminal device 110 may transmit 470, to the location server 140, information on the time difference t1 (for example, based on the second assistance information). The serving network device 130 may transmit 480, to the location server 140, information on the time difference t5 (for example, based on the third assistance information).

The location server 140 may determine the RTT or propagation delay between the neighboring network device 120 and the terminal device 110 based on the time differences t1~t5. Then, the location server 140 can determine the position of the terminal device 110 based on the determined RTT or propagation delay.

It can be seen from the above that, embodiments of the present disclosure provide a scheme for multi-cell positioning. The scheme enables the increased number of hearable network devices in the RTT scheme. Since more RTT measurements can be obtained, the position accuracy can be improved. In addition, there is no need for a terminal device to transmit an UL signal to a neighboring network device. Therefore, the scheme does not require large overhead or complex signaling. In addition, compared with other timing-based positioning techniques (such as, techniques based on OTDOA or UTDOA), embodiments of the present disclosure do not suffer from synchronization errors.

Figure 5:
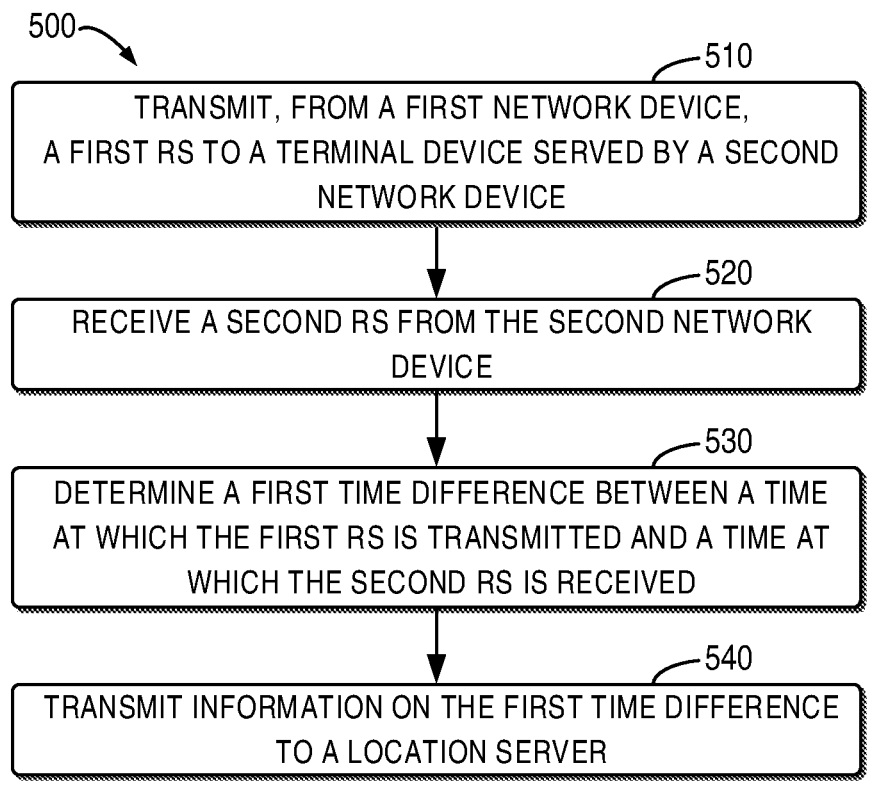
FIG. 5 illustrates a flowchart of an example method according to embodiments of the present disclosure.

FIG. 5 illustrates a flowchart of a method 500 in accordance with embodiments of the present disclosure. The method 500 may be implemented at the neighboring network device 120 in the communication network 100. It is to be understood that method 500 may further include additional blocks not shown and/or omit some shown blocks, and the scope of the present disclosure is not limited in this regard.

At block 510, the first network device 120 transmits a first RS to a terminal device served by a second network device.

At block 520, the neighboring network device 120 receives a second RS from the second network device.

At block 530, the neighboring network device 120 determines a first time difference between a time at which the first RS is transmitted and a time at which the second RS is received.

At block 540, the neighboring network device 120 transmits information on the first time difference to a location server.

In some embodiments, transmitting the information on the first time difference comprises: in response to receiving a first request for positioning information from the location server, transmitting the information on the first time difference to the location server.

In some embodiments, the method 500 further comprises receiving first assistance information from the location server, the first assistance information indicating at least one of: a first configuration about the second RS, and a second configuration for reporting a time difference to the location server.

In some embodiments, receiving the second RS comprises: in response to the first assistance information indicating the first configuration and the first configuration comprising information for receiving the second RS, receiving the second RS based on the first configuration.

In some embodiments, determining the first time difference comprises: in response to the first assistance information indicating the first configuration and the first configuration comprising information for timing measurement, determining the time at which the second RS is received based on the first configuration.

In some embodiments, transmitting the information on the first time difference comprises: in response to the first assistance information indicating the second configuration, transmitting the information on the first time difference to the location server based on the second configuration.

Figure 6:
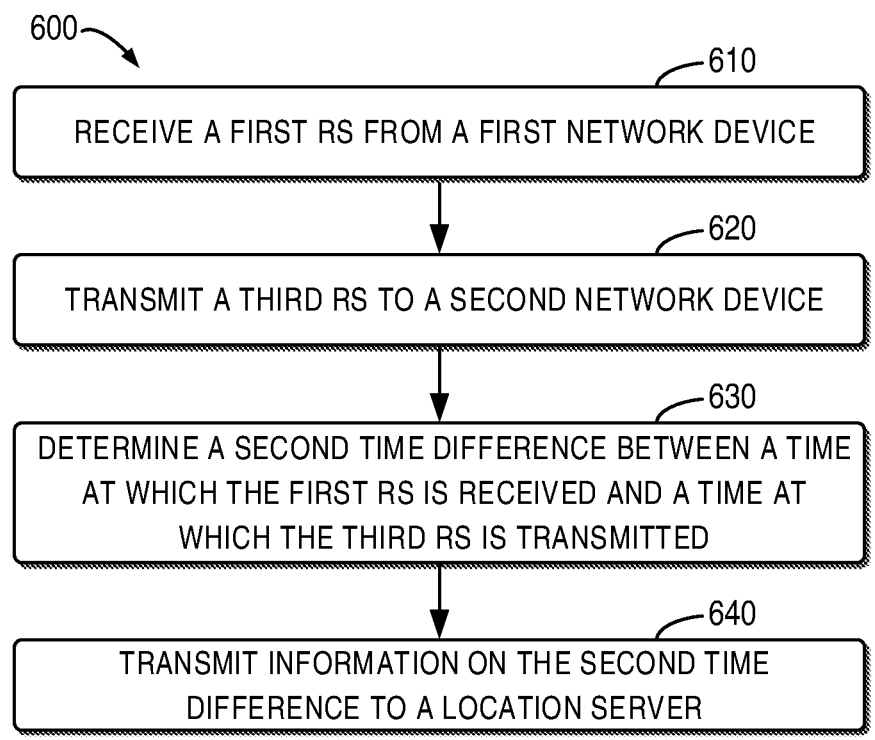
FIG. 6 illustrates a flowchart of an example method according to embodiments of the present disclosure.

FIG. 6 illustrates a flowchart of a method 600 in accordance with embodiments of the present disclosure. The method 200 may be implemented at the terminal device 110 in the communication network 100. It is to be understood that method 600 may further include additional blocks not shown and/or omit some shown blocks, and the scope of the present disclosure is not limited in this regard.

At block 610, the terminal device 110 receives a first RS from a first network device.

At block 620, the terminal device 110 transmits a third RS to a second network device serving the terminal device 110.

At block 630, the terminal device 110 determines a second time difference between a time at which the first RS is received and a time at which the third RS is transmitted.

At block 640, the terminal device 110 transmits information on the second time difference to a location server.

In some embodiments, the method 600 further comprises: receiving a fourth RS from the second network device; transmitting a fifth RS to the second network device; determining a third time difference between a time at which the fourth RS is received and a time at which the fifth RS is transmitted; and transmitting information on the third time difference to the location server.

In some embodiments, the third RS and the fifth RS are the same RS.

In some embodiments, transmitting the information on the second time difference comprises: in response to receiving a second request for positioning information from the location server, transmitting the information on the second time difference to the location server.

In some embodiments, transmitting the information on the third time difference comprises: in response to receiving the second request from the location server, transmitting the information on the third time difference to the location server.

In some embodiments, the method 600 further comprises: receiving second assistance information from the location server, the second assistance information indicating a third configuration for reporting a time difference to the location server.

In some embodiments, transmitting the information on the second time difference comprises: transmitting the information on the second time difference to the location server based on the third configuration.

Figure 7:
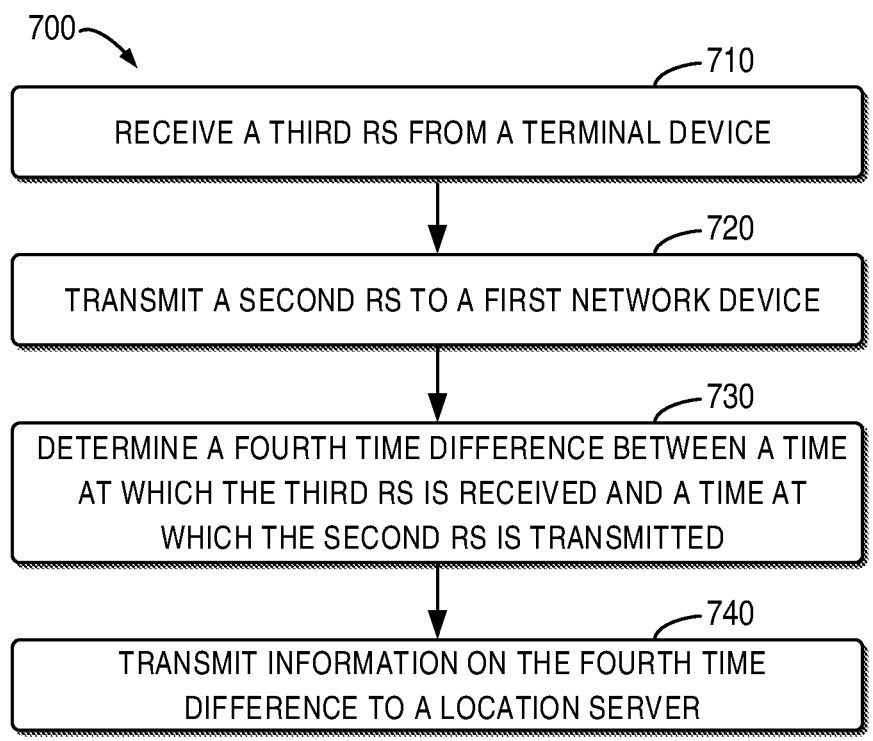
FIG. 7 illustrates a flowchart of an example method according to embodiments of the present disclosure.

FIG. 7 illustrates a flowchart of a method 700 in accordance with embodiments of the present disclosure. The method 700 may be implemented at the serving network device 130 in the communication network 100. It is to be understood that method 700 may further include additional blocks not shown and/or omit some shown blocks, and the scope of the present disclosure is not limited in this regard.

At block 710, the serving network device 130 receives, from a terminal device, a third RS at a second network device serving the terminal device.

At block 720, the serving network device 130 transmits a second RS to a first network device.

At block 730, the serving network device 130 determines a fourth time difference between a time at which the third RS is received and a time at which the second RS is transmitted.

At block 740, the serving network device 130 transmits information on the fourth time difference to a location server.

In some embodiments, the method 700 further comprises: transmitting, from the second network device, a fourth RS to the terminal device; receiving a fifth RS from the terminal device; determining a fifth time difference between a time at which the fourth RS is transmitted and a time at which the fifth RS is received; and transmitting information on the fifth time difference to the location server.

In some embodiments, the fourth RS and the second RS are a same RS.

In some embodiments, transmitting the second RS comprises: in response to receiving from the location server a third request for positioning information, transmitting the second RS to the first network device; and transmitting, to the location server, a response comprising configuration information about the second RS.

In some embodiments, transmitting the second RS comprises: transmitting the second RS to the first network device by beam forming the second RS in a direction of the first network device.

In some embodiments, transmitting the information on the fourth time difference comprises: in response to receiving the third request from the location server, transmitting the information on the fourth time difference to the location server.

In some embodiments, transmitting the information on the fifth time difference comprises: in response to receiving the third request from the location server, transmitting the information on the fifth time difference to the location server.

In some embodiments, the method 700 further comprises receiving third assistance information from the location server, the third assistance information indicating at least one of: a fourth configuration for transmitting the second RS, and a fifth configuration for reporting a time difference to the location server.

In some embodiments, transmitting the second RS comprises: in response to the third assistance information indicating the fourth configuration, transmitting the second RS to the terminal device based on the fourth configuration.

In some embodiments, transmitting the information on the fourth time difference comprises: in response to the third assistance information indicating the fifth configuration, transmitting the information on the fourth time difference to the location server based on the fifth configuration.

Figure 8:
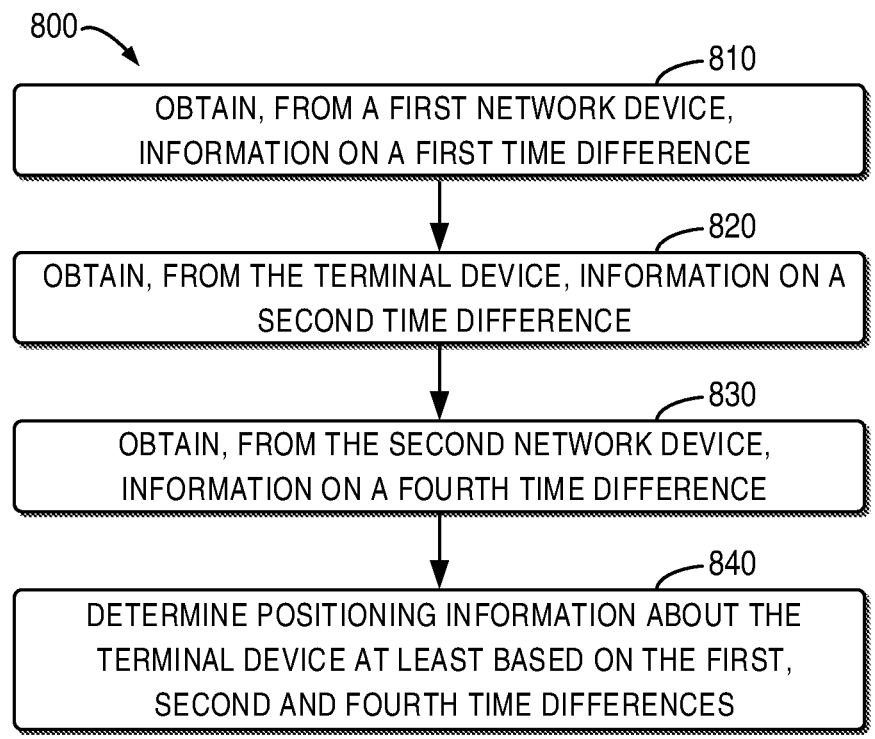
FIG. 8 illustrates a flowchart of an example method according to embodiments of the present disclosure.

FIG. 8 illustrates a flowchart of a method 800 in accordance with embodiments of the present disclosure. The method 800 may be implemented at the location server 140 in the communication network 100. It is to be understood that method 800 may further include additional blocks not shown and/or omit some shown blocks, and the scope of the present disclosure is not limited in this regard.

At block 810, the location server 140 obtains, from a first network device, information on a first time difference between a time at which the first network device transmits a first reference signal (RS) to a terminal device served by a second network device and a time at which the first network device receives a second RS from the second network device.

At block 820, the location server 140 obtains, from the terminal device, information on a second time difference between a time at which the terminal device receives the first RS from the first network device and a time at which the terminal device transmits a third RS to the second network device.

At block 830, the location server 140 obtains, from the second network device, information on a fourth time difference between a time at which the second network device receives the third RS from the terminal device and a time at which the second network device transmits the second RS to the first network device.

At block 840, the location server 140 determines positioning information about the terminal device at least based on the first, second and fourth time differences.

In some embodiments, obtaining the information on the first time difference comprises: transmitting, to the first network device, a first request for positioning information; and in response to the first request being transmitted to the first network device, receiving the information on the first time difference from the first network device.

In some embodiments, the method 800 further comprises transmitting first assistance information to the first network device, the first assistance information indicating at least one of: a first configuration about the second RS, and a second configuration for reporting a time difference to the location server.

In some embodiments, obtaining the information on the first time difference comprises: in response to the first assistance information indicating the second configuration being transmitted, receiving the information on the first time difference from the first network device based on the second configuration.

In some embodiments, obtaining the information on the second time difference comprises: transmitting, to the terminal device, a second request for positioning information; and in response to the second request being transmitted to the terminal device, receiving the information on the second time difference from the terminal device.

In some embodiments, the method 800 further comprises: transmitting second assistance information to the terminal device, the second assistance information indicating a third configuration for reporting a time difference to the location server.

In some embodiments, obtaining the information on the second time difference comprises: receiving the information on the second time difference from the terminal device based on the third configuration.

In some embodiments, obtaining the information on the fourth time difference comprises: transmitting, to the second network device, a third request for positioning information; and in response to the third request being transmitted to the second network device, receiving the information on the fourth time difference from the second network device.

In some embodiments, the method 800 further comprises receiving a response to the third request from the second network device, the response indicating configuration information about the second reference signal.

In some embodiments, the method 800 further comprises transmitting third assistance information to the second network device, the third assistance information indicating at least one of: a fourth configuration for transmitting the second RS, and a fifth configuration for reporting a time difference to the location server.

In some embodiments, obtaining the information on the fourth time difference comprises: in response to the third assistance information indicating the fifth configuration being transmitted, receiving the information on the fourth time difference from the second network device based on the fifth configuration.

In some embodiments, determining the positioning information about the terminal device comprises: determining propagation delay from the first network device to the terminal device at least based on the first, second and fourth time differences.

In some embodiments, determining the positioning information about the terminal device comprises: determining a first round trip time (RTT) between the first network device and the terminal device at least based on the first, second and fourth time differences.

In some embodiments, determining the positioning information about the terminal device comprises: determining a second RTT between the terminal device and the second network device; and determining the positioning information about the terminal device based on the second RTT and the first, second and fourth time differences.

In some embodiments, determining the second RTT comprises: obtaining, from the terminal device, a third time difference between a time at which the terminal device receives a fourth RS from the second network device and a time at which the terminal device transmits a fifth RS to the second network device; obtaining, from the second network device, a fifth time difference between a time at which the second network device transmits the fourth RS to the terminal device and a time at which the second network device receives the fifth RS from the terminal device; and determining the second RTT between the terminal device and the second network device based on the third and fifth time differences.

In some embodiments, an apparatus capable of performing the method 500, 600, 700 and/or 800 may comprise means for performing respective steps of the method 500, 600, 700 and/or 800. The means may be implemented in any suitable form. For example, the means may be implemented in a circuitry or software module.

In some embodiments, the means comprises at least one processor; and at least one memory including computer program code, the at least one memory and computer program code configured to, with the at least one processor, cause the performance of the apparatus.

In some embodiments, the apparatus capable of performing the method 500 comprises: means for transmitting, from a first network device, a first reference signal (RS) to a terminal device served by a second network device; means for receiving a second RS from the second network device; means for determining a first time difference between a time at which the first RS is transmitted and a time at which the second RS is received; and means for transmitting information on the first time difference to a location server.

In some embodiments, the means for transmitting the information on the first time difference comprises: means for in response to receiving a first request for positioning information from the location server, transmitting the information on the first time difference to the location server.

In some embodiments, the apparatus capable of performing the method 500 further comprises: means for receiving first assistance information from the location server, the first assistance information indicating at least one of: a first configuration about the second RS, and a second configuration for reporting a time difference to the location server.

In some embodiments, the means for receiving the second RS comprises: means for in response to the first assistance information indicating the first configuration and the first configuration comprising information for receiving the second RS, receiving the second RS based on the first configuration.

In some embodiments, the means for determining the first time difference comprises: means for in response to the first assistance information indicating the first configuration and the first configuration comprising information for timing measurement, determining the time at which the second RS is received based on the first configuration.

In some embodiments, the means for transmitting the information on the first time difference comprises: means for in response to the first assistance information indicating the second configuration, transmitting the information on the first time difference to the location server based on the second configuration.

In some embodiments, the apparatus capable of performing the method 600 comprises: means for receiving, at a terminal device, a first reference signal (RS) from a first network device; means for transmitting a third RS to a second network device serving the terminal device; means for determining a second time difference between a time at which the first RS is received and a time at which the third RS is transmitted; and means for transmitting information on the second time difference to a location server.

In some embodiments, the apparatus capable of performing the method 600 further comprises: means for receiving a fourth RS from the second network device; means for transmitting a fifth RS to the second network device; means for determining a third time difference between a time at which the fourth RS is received and a time at which the fifth RS is transmitted; and means for transmitting information on the third time difference to the location server.

In some embodiments, the third RS and the fifth RS are the same RS.

In some embodiments, the means for transmitting the information on the second time difference comprises: means for in response to receiving a second request for positioning information from the location server, transmitting the information on the second time difference to the location server.

In some embodiments, the means for transmitting the information on the third time difference comprises: means for in response to receiving the second request from the location server, transmitting the information on the third time difference to the location server.

In some embodiments, the apparatus capable of performing the method 600 further comprises: means for receiving second assistance information from the location server, the second assistance information indicating a third configuration for reporting a time difference to the location server.

In some embodiments, the means for transmitting the information on the second time difference comprises: means for transmitting the information on the second time difference to the location server based on the third configuration.

In some embodiments, the apparatus capable of performing the method 700 comprises: means for receiving, from a terminal device, a third reference signal (RS) at a second network device serving the terminal device; means for transmitting a second RS to a first network device; means for determining a fourth time difference between a time at which the third RS is received and a time at which the second RS is transmitted; and means for transmitting information on the fourth time difference to a location server.

In some embodiments, the apparatus capable of performing the method 700 further comprises: means for transmitting, from the second network device, a fourth RS to the terminal device; receiving a fifth RS from the terminal device; means for determining a fifth time difference between a time at which the fourth RS is transmitted and a time at which the fifth RS is received; and means for transmitting information on the fifth time difference to the location server.

In some embodiments, the fourth RS and the second RS are a same RS.

In some embodiments, the means for transmitting the second RS comprises: means for in response to receiving from the location server a third request for positioning information, transmitting the second RS to the first network device; and means for transmitting, to the location server, a response comprising configuration information about the second RS.

In some embodiments, the means for transmitting the second RS comprises: means for transmitting the second RS to the first network device by beam forming the second RS in a direction of the first network device.

In some embodiments, the means for transmitting the information on the fourth time difference comprises: means for in response to receiving the third request from the location server, transmitting the information on the fourth time difference to the location server.

In some embodiments, the means for transmitting the information on the fifth time difference comprises: means for in response to receiving the third request from the location server, transmitting the information on the fifth time difference to the location server.

In some embodiments, the apparatus capable of performing the method 700 further comprises means for receiving third assistance information from the location server, the third assistance information indicating at least one of: a fourth configuration for transmitting the second RS, and a fifth configuration for reporting a time difference to the location server.

In some embodiments, the means for transmitting the second RS comprises: means for in response to the third assistance information indicating the fourth configuration, transmitting the second RS to the terminal device based on the fourth configuration.

In some embodiments, the means for transmitting the information on the fourth time difference comprises: means for in response to the third assistance information indicating the fifth configuration, transmitting the information on the fourth time difference to the location server based on the fifth configuration.

In some embodiments, the apparatus capable of performing the method 800 comprises: means for obtaining, from a first network device, information on a first time difference between a time at which the first network device transmits a first reference signal (RS) to a terminal device served by a second network device and a time at which the first network device receives a second RS from the second network device; means for obtaining, from the terminal device, information on a second time difference between a time at which the terminal device receives the first RS from the first network device and a time at which the terminal device transmits a third RS to the second network device; means for obtaining, from the second network device, information on a fourth time difference between a time at which the second network device receives the third RS from the terminal device and a time at which the second network device transmits the second RS to the first network device; and means for determining positioning information about the terminal device at least based on the first, second and fourth time differences.

In some embodiments, the means for obtaining the information on the first time difference comprises: means for transmitting, to the first network device, a first request for positioning information; and means for in response to the first request being transmitted to the first network device, receiving the information on the first time difference from the first network device.

In some embodiments, the apparatus capable of performing the method 800 further comprises means for transmitting first assistance information to the first network device, the first assistance information indicating at least one of: a first configuration about the second RS, and a second configuration for reporting a time difference to the location server.

In some embodiments, the means for obtaining the information on the first time difference comprises: means for in response to the first assistance information indicating the second configuration being transmitted, receiving the information on the first time difference from the first network device based on the second configuration.

In some embodiments, the means for obtaining the information on the second time difference comprises: means for transmitting, to the terminal device, a second request for positioning information; and means for in response to the second request being transmitted to the terminal device, receiving the information on the second time difference from the terminal device.

In some embodiments, the apparatus capable of performing the method 800 further comprises: means for transmitting second assistance information to the terminal device, the second assistance information indicating a third configuration for reporting a time difference to the location server.

In some embodiments, the means for obtaining the information on the second time difference comprises: means for receiving the information on the second time difference from the terminal device based on the third configuration.

In some embodiments, the apparatus capable of performing the method 800 further comprises: means for transmitting, to the second network device, a third request for transmitting the second RS from the second network device to the first network device; and means for receiving a response to the third request from the second network device, the response indicating configuration information about the second RS.

In some embodiments, the means for obtaining the information on the fourth time difference comprises: means for transmitting, to the second network device, a third request for positioning information; and means for in response to the third request being transmitted to the second network device, receiving the information on the fourth time difference from the second network device.

In some embodiments, the apparatus capable of performing the method 800 further comprises means for receiving a response to the third request from the second network device, the response indicating configuration information about the second reference signal.

In some embodiments, the apparatus capable of performing the method 800 further comprises means for transmitting third assistance information to the second network device, the third assistance information indicating at least one of: a fourth configuration for transmitting the second RS, and a fifth configuration for reporting a time difference to the location server.

In some embodiments, the means for obtaining the information on the fourth time difference comprises: means for in response to the third assistance information indicating the fifth configuration being transmitted, receiving the information on the fourth time difference from the second network device based on the fifth configuration.

In some embodiments, the means for determining the positioning information about the terminal device comprises: means for determining propagation delay from the first network device to the terminal device at least based on the first, second and fourth time differences.

In some embodiments, the means for determining the positioning information about the terminal device comprises: means for determining a first RTT between the first network device and the terminal device at least based on the first, second and fourth time differences.

In some embodiments, the means for determining the positioning information about the terminal device comprises: means for determining a second RTT between the terminal device and the second network device; and means for determining the positioning information about the terminal device based on the second RTT and the first, second and fourth time differences.

In some embodiments, the means for determining the second RTT comprises: means for obtaining, from the terminal device, a third time difference between a time at which the terminal device receives a fourth RS from the second network device and a time at which the terminal device transmits a fifth RS to the second network device; means for obtaining, from the second network device, a fifth time difference between a time at which the second network device transmits the fourth RS to the terminal device and a time at which the second network device receives the fifth RS from the terminal device; and means for determining the second RTT between the terminal device and the second network device based on the third and fifth time differences.

Figure 9:
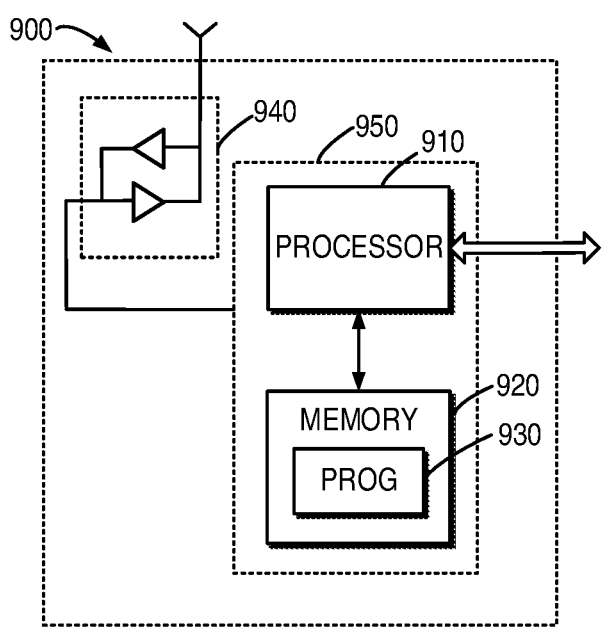
FIG. 9 is a simplified block diagram of a device that is suitable for implementing embodiments of the present disclosure.

FIG. 9 is a simplified block diagram of a device 900 that is suitable for implementing embodiments of the present disclosure. The device 900 may be used to implement the terminal device 110, the neighboring network device 120, the serving network device 130 or the location server as shown in FIG. 1.

As shown, the device 900 includes a processor 910, a memory 920 coupled to the processor 910, a suitable transmitter (TX) and receiver (RX) 940 coupled to the processor 910, and a communication interface coupled to the TX/RX 940. The memory 920 stores at least a part of a program 930. The TX/RX 940 is for bidirectional communications.

The TX/RX 940 has at least one antenna to facilitate communication, though in practice an Access Node mentioned in this application may have several ones. The communication interface may represent any interface that is necessary for communication with other network elements.

The program 930 is assumed to include program instructions that, when executed by the associated processor 910, enable the device 900 to operate in accordance with the implementations of the present disclosure, as discussed herein with reference to FIGS. 1 to 8. The implementations herein may be implemented by computer software executable by the processor 910 of the device 900, or by hardware, or by a combination of software and hardware. The processor 910 may be configured to implement various implementations of the present disclosure. Furthermore, a combination of the processor 910 and memory 920 may form processing means 950 adapted to implement various implementations of the present disclosure.

The memory 920 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 920 is shown in the device 900, there may be several physically distinct memory modules in the device 900. The processor 910 may be of any type suitable to the local technical network, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 500 as described above with reference to FIG. 5, the method 600 as described above with reference to FIG. 6, the method 700 as described above with reference to FIG. 7 and/or the method 800 as described above with reference to FIG. 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

For the purpose of the present disclosure as described herein above, it should be noted that, method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various embodiments of the techniques have been described. In addition to or as an alternative to the above, the following examples are described. The features described in any of the following examples may be utilized with any of the other examples described herein.

What is claimed is:

1. A terminal device comprising:
at least one processor; and
at least one non-transitory memory;
the at least one non-transitory memory storing instructions that when executed by the at least one processor, cause the terminal device at least to perform:
receiving a first reference signal from a first network device;
transmitting a third reference signal to a second network device serving the terminal device;
determining a second time difference between a time at which the first reference signal is received and a time at which the third reference signal is transmitted; and
transmitting information on the second time difference to a location server.

2. The terminal device of claim 1, wherein the at least one non-transitory memory storing instructions is executed by the at least one processor to cause the terminal device at least to perform:
receiving a fourth reference signal from the second network device;
transmitting a fifth reference signal to the second network device;
determining a third time difference between a time at which the fourth reference signal is received and a time at which the fifth reference signal is transmitted; and
transmitting information on the third time difference to the location server.

3. The terminal device of claim 2, wherein the third reference signal and the fifth reference signal are the same reference signal.

4. The terminal device of claim 2, wherein transmitting the information on the second time difference comprises:
in response to receiving a second request for positioning information from the location server, transmitting the information on the second time difference to the location server.

5. The terminal device of claim 1, further comprising wherein the at least one non-transitory memory storing instructions is executed by the at least one processor to cause the terminal device at least to perform:
receiving second assistance information from the location server, the second assistance information indicating a third configuration for reporting a time difference to the location server.

6. The terminal device of claim 5, wherein transmitting the information on the second time difference comprises:
transmitting the information on the second time difference to the location server based on the third configuration.

7. A first network device comprising:
at least one processor; and
at least one non-transitory memory;
the at least one non-transitory memory storing instructions that when executed by the at least one processor, cause the first network device at least to perform:
transmitting a first reference signal to a terminal device served by a second network device;
receiving a second reference signal from the second network device;
determining a first time difference between a time at which the first reference signal is transmitted and a time at which the second reference signal is received; and
transmitting information on the first time difference to a location server.

8. A non-transitory computer readable storage medium comprising
program instructions stored thereon, the instructions, when executed by a processor of a first network device, causing the first network device to:
transmit a first reference signal to a terminal device served by a second network device;
receive a second reference signal from the second network device;

determine a first time difference between a time at which the first reference signal is transmitted and a time at which the second reference signal is received; and transmit information on the first time difference to a location server.

9. The terminal device of claim 1, wherein the at least one non-transitory memory is storing instructions that when executed by the at least one processor, cause the device at least to perform:

receiving a fourth reference signal from the second network device;

transmitting a fifth reference signal to the second network device;

determining a third time difference between a time at which the fourth reference signal is received and a time at which the fifth reference signal is transmitted; and transmitting information on the third time difference to the location server.

10. The terminal device of claim 1, wherein the third reference signal and the fifth reference signal are the same reference signal.

11. The terminal device of claim 1, wherein the at least one non-transitory memory is storing instructions that when executed by the at least one processor, cause the device at least to perform the transmitting of the information on the second time difference comprising:

in response to receiving a second request for positioning information from the location server, transmitting the information on the second time difference to the location server.

12. The terminal device of claim 1, wherein the at least one non-transitory memory is storing instructions that when executed by the at least one processor, cause the device at least to perform the transmitting of the information on the third time difference comprising:

in response to receiving the second request from the location server, transmitting the information on the third time difference to the location server.

13. The terminal device of claim 1, wherein the at least one non-transitory memory is storing instructions that when executed by the at least one processor, cause the device at least to perform:

receiving second assistance information from the location server, the second assistance information indicating a third configuration for reporting a time difference to the location server.

14. The terminal device of claim 1, wherein the at least one non-transitory memory is storing instructions that when executed by the at least one processor, cause the device at least to perform the transmitting of the information on the second time difference comprising:

transmitting the information on the second time difference to the location server based on the third configuration.

15. The first network device of claim 7, wherein the at least one non-transitory memory is storing instructions that when executed by the at least one processor, cause the device at least to perform the transmitting of the information on the first time difference comprising:

in response to receiving a first request for positioning information from the location server, transmitting the information on the first time difference to the location server.

16. The first network device of claim 7, wherein the at least one non-transitory memory is storing instructions that when executed by the at least one processor, cause the device at least to perform:

receiving first assistance information from the location server, the first assistance information indicating at least one of:
a first configuration about the second reference signal, or
a second configuration for reporting a time difference to the location server.

17. The first network device of claim 7, wherein the at least one non-transitory memory is storing instructions that when executed by the at least one processor, cause the device at least to perform the receiving of the second reference signal comprising:

in response to the first assistance information indicating the first configuration and the first configuration comprising information for receiving the second reference signal, receiving the second reference signal based on the first configuration; and wherein determining the first time difference comprises:
in response to the first assistance information indicating the first configuration and the first configuration comprising information for timing measurement, determining the time at which the second reference signal is received based on the first configuration.

18. The first network device of claim 7, wherein the at least one non-transitory memory is storing instructions that when executed by the at least one processor, cause the device at least to perform the transmitting of the information on the first time difference comprising:

in response to the first assistance information indicating the second configuration, transmitting the information on the first time difference to the location server based on the second configuration.

* * * * *